United States Patent
Shirata

(10) Patent No.: US 9,957,167 B2
(45) Date of Patent: May 1, 2018

(54) METHOD OF MANUFACTURING HEXAGONAL FERRITE POWDER, HEXAGONAL FERRITE POWDER, MAGNETIC RECORDING MEDIUM AND METHOD OF MANUFACTURING MAGNETIC RECORDING MEDIUM

(71) Applicant: FUJIFILM Corporation, Tokyo (JP)

(72) Inventor: Masashi Shirata, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 155 days.

(21) Appl. No.: 15/196,859

(22) Filed: Jun. 29, 2016

(65) Prior Publication Data

US 2017/0004912 A1    Jan. 5, 2017

(30) Foreign Application Priority Data

Jun. 30, 2015 (JP) ................. 2015-131197

(51) Int. Cl.
| | |
|---|---|
| H01F 1/10 | (2006.01) |
| G11B 5/68 | (2006.01) |
| C01G 49/00 | (2006.01) |
| G11B 5/706 | (2006.01) |
| H01F 1/11 | (2006.01) |
| C04B 35/26 | (2006.01) |
| C04B 35/632 | (2006.01) |

(52) U.S. Cl.
CPC ...... *C01G 49/0036* (2013.01); *C04B 35/2683* (2013.01); *C04B 35/632* (2013.01); *G11B 5/70678* (2013.01); *H01F 1/11* (2013.01); *C01P 2004/64* (2013.01); *C01P 2006/42* (2013.01); *C04B 2235/3213* (2013.01); *C04B 2235/3215* (2013.01); *C04B 2235/5454* (2013.01); *C04B 2235/5481* (2013.01); *C04B 2235/767* (2013.01)

(58) Field of Classification Search
CPC ... C01G 49/0036; G11B 5/70678; H10F 1/11; C04B 35/2683; C04B 35/632; C04B 2235/3213; C04B 2235/3215; C04B 2235/5454; C04B 2235/767; C01P 2006/64; C01P 2006/42
See application file for complete search history.

(56) References Cited

U.S. PATENT DOCUMENTS

| | | | |
|---|---|---|---|
| 2015/0279406 A1* | 10/2015 | Shirata | G11B 5/70678 428/842.8 |
| 2016/0203894 A1* | 7/2016 | Shirata | G11B 5/70678 428/836.2 |

FOREIGN PATENT DOCUMENTS

| | | |
|---|---|---|
| JP | 2009-208969 A | 9/2009 |
| WO | 2015/046496 A1 | 4/2015 |

\* cited by examiner

*Primary Examiner* — C Melissa Koslow
(74) *Attorney, Agent, or Firm* — Sughrue Mion, PLLC

(57) ABSTRACT

The method of manufacturing hexagonal ferrite powder includes preparing a hexagonal ferrite precursor by mixing an iron salt and a divalent metal salt in a water-based solution, and converting the hexagonal ferrite precursor into hexagonal ferrite within a reaction flow passage, within which a fluid flowing therein is subjected to heating and pressurizing, by continuously feeding a water-based solution containing the hexagonal ferrite precursor and gelatin to the reaction flow passage.

18 Claims, 6 Drawing Sheets

METHOD OF MANUFACTURING HEXAGONAL FERRITE POWDER, HEXAGONAL FERRITE POWDER, MAGNETIC RECORDING MEDIUM AND METHOD OF MANUFACTURING MAGNETIC RECORDING MEDIUM

CROSS-REFERENCE TO RELATED APPLICATIONS

This application claims priority under 35 U.S.C 119 to Japanese Patent Application No. 2015-131197 filed on Jun. 30, 2015. The above application is hereby expressly incorporated by reference, in its entirety.

BACKGROUND OF THE INVENTION

Field of the Invention

The present invention elates to a method of manufacturing hexagonal ferrite powder, hexagonal ferrite powder, a magnetic recording medium and a method of manufacturing a magnetic recording medium.

Discussion of the Background

Hexagonal ferrite powder is widely employed as the ferromagnetic powder contained in the magnetic layer of magnetic recording media. The coercive force thereof is great enough for use in permanent magnetic materials. The magnetic anisotropy that is the basis of the coercive force derives from its crystal structure. Thus, high coercive force can be maintained even when the size of the particles is reduced. In magnetic recording media having a magnetic layer employing hexagonal ferrite powder, the high-density characteristic can be good due to the vertical component. Thus, hexagonal ferrite powder is ferromagnetic powder that is suited to achieving higher density recording.

Various methods are employed to manufacture hexagonal ferrite powder, such as the coprecipitation method and the glass crystallization method. A manufacturing method (referred to hereinafter as the hydrothermal synthesis process) that utilizes a hydrothermal synthesis reaction in the presence of heated and pressurized water known as supercritical water or subcritical water has also been proposed (for example, see WO 2015/046496A1 and Japanese Unexamined Patent Publication (KOKAI) No. 2009-208969, which are expressly incorporated herein by reference in their entirety).

SUMMARY OF THE INVENTION

The hydrothermal synthesis process can convert a hexagonal ferrite precursor into hexagonal ferrite in the presence of heated and pressurized water to manufacture hexagonal ferrite powder. The hydrothermal synthesis process is a method permitting the manufacture of hexagonal ferrite powder with high productivity and has attracted attention in recent years.

Particulate magnetic recording media (also referred to simply as "magnetic recording media" hereinafter) can be manufactured by coating a magnetic layer-forming composition, either directly on a nonmagnetic support, or over a nonmagnetic layer that has been formed on a nonmagnetic support, to form a magnetic layer. In addition to ferromagnetic powder, the magnetic layer-forming composition can contain organic solvent, binder, and various optional additives. When the ferromagnetic powder in the composition aggregates, the magnetic layer that is formed ends up with poor surface smoothness due to the aggregated ferromagnetic powder. Accordingly, the magnetic layer-forming composition is normally prepared by conducting a dispersion treatment with a disperser. However, the dispersion treatment can require an extended period, ultimately compromising the efficiency of magnetic recording medium production. Thus, it is desirable to shorten the dispersion period of the magnetic layer-forming composition in order to increase the efficiency of magnetic recording medium production. In general, however, the particle surface of hexagonal ferrite powder has poor affinity for organic solvent and binder, and the particles tend to aggregate. Further, the smaller the particle size is made to achieve higher density recording, the more dispersion tends to be compromised.

An aspect of the present invention provides for hexagonal ferrite powder that can disperse well in the presence of organic solvent and binder.

The present inventor conducted extensive research. As a result, he discovered that hexagonal ferrite powder that disperses well in the presence of organic solvent and binder could be obtained by conducting converting hexagonal ferrite precursor into hexagonal ferrite in the presence of gelatin in the hydrothermal synthesis process.

An aspect of the present invention relates to a method of manufacturing hexagonal ferrite powder, which includes:

preparing a hexagonal ferrite precursor by mixing an iron salt and a divalent metal salt in a water-based solution; and converting the hexagonal ferrite precursor into hexagonal ferrite within a reaction flow passage, within which a fluid flowing therein is subjected to heating and pressurizing, by continuously feeding a water-based solution containing the hexagonal ferrite precursor and gelatin to the reaction flow passage.

The gelatin is placed in the presence of heated and pressurized water in the reaction flow passage.

In the present invention, polypeptides satisfying all of (1) to (3) below in the state prior to being placed in the presence of heated and pressurized water are referred to as "gelatin". The fact that they are polypeptides can be confirmed by known methods such as the polypeptide detection methods of proteins and the like. Examples are the ultraviolet absorption method, Bradford method (coomassie blue method), Lowry method (phenol reagent method), and bicinchoninic acid (BCA) method. The quantity of gelatin that is contained in the hexagonal ferrite powder can also be determined by these known methods:

(1) Having a weight average molecular weight as determined by gel permeation chromatography (GPC) and converted to a standard polystyrene equivalent falling within a range of 10,000 to 200,000. The weight average molecular weight that is referred to in the present specification is a value that is measured under the following measurement conditions:

GPC device: HLC-8220 (made by Tosoh)

Column: TSK gel Multipore HXL-M (made by Tosoh, inner diameter 7.8 mm, column length 300 mm)

Eluent: Tetrahydrofuran (THF)

(2) Having solubility in water. The term "solubility in water" means dissolution of greater than or equal to 1 g in 100 mL of pure water at a temperature of 40° C.

(3) Having gelling ability. The term. "gelling" refers to an entire system being in a solid state, relative to a liquid "sol" with fluidity. The fact that it is in a solid state is defined as, in accordance with the jelly strength measurement method specified in JIS K6503: 2001, which is expressly incorporated herein by reference in its entirety, the load required for a plunger ½ inch (12.7 mm) in diameter to press down 4 mm the surface of a jelly prepared by cooling a 6.67 weight % gelatin water-based solution for 17 hours at a liquid temperature of 10° C. being greater than or equal to 1 g.

Gelatin is a hydrolysis product of collagen that is thought to have the properties of water solubility and gelling due to the functional groups imparted by hydrolysis and/or chemical modification. The present inventor presumes that within the reaction flow passage, the presence of heated and pressurized water can create a highly reactive state within which the functional groups present in the gelatin are modified, thereby contributing to obtaining hexagonal ferrite powder with good dispersion in the presence of organic solvent and binder. However, this is merely a presumption and does not limit the present invention in any way.

The gelatin that is contained in the hexagonal ferrite powder that has been manufactured will sometimes not satisfy all of (1) to (3) above once it has been modified. However, such forms are also considered to be "gelatin" contained in the hexagonal ferrite powder in the present invention. The fact that gelatin is contained in the hexagonal ferrite powder after it has been placed in the presence of heated and pressured water can be confirmed by the fact that it disperses better in the presence of organic solvent and binder than hexagonal ferrite powder in which gelatin has been incorporated (for example, by being coated with gelatin) without undergoing the hydrothermal synthesis process.

In one embodiment, preparation of the hexagonal ferrite precursor is conducted in the presence of gelatin.

In one embodiment, the concentration of gelatin in the water-based solution containing the iron salt and divalent metal salt falls within a range of 0.3 g/L to 35.0 g/L.

In one embodiment, the water-based solution containing the hexagonal ferrite precursor and gelatin is prepared by sequentially merging a feed passage to which a water-based solution containing the hexagonal ferrite precursor is being fed and a feed passage to which a water-based solution containing gelatin is being fed with a feed passage to which heated and pressurized water is being fed. The heated and pressurized water can be merged with the feed passages to which the solutions are being fed by first merging it with the feed passage to which the water-based solution containing the hexagonal ferrite precursor is being fed or by first merging it with the feed passage to which the water-based solution containing gelatin is being fed.

In one embodiment, the concentration of the gelatin in the water-based solution containing gelatin falls within a range of 0.3 g/L to 35.0 g/L.

In one embodiment, hexagonal ferrite precursor is converted to hexagonal ferrite within the reaction flow passage by continuously feeding the water-based solution containing the hexagonal ferrite precursor and gelatin while heating it to greater than or equal to 300° C. and pressurizing it to greater than or equal to 20 MPa.

In one embodiment, the hexagonal ferrite that is obtained by the above conversion contains 1.0 weight % to 60.0 weight % gelatin.

In one embodiment, the divalent metal salt is one or more divalent metal salt selected from the group consisting of barium salts and strontium salts.

In one embodiment, the average particle size of the hexagonal ferrite powder that is manufactured by the above manufacturing method falls within a range of 5 nm to 30 nm.

In one embodiment, the coefficient of variation in the particle size of the hexagonal ferrite powder that is manufactured by the above manufacturing method falls within a range of 5% to 35%.

In one embodiment, hexagonal ferrite powder that is employed as magnetic powder for magnetic recording is manufactured by the above manufacturing method.

A further aspect of the present invention relates to hexagonal ferrite powder that is manufactured by the above manufacturing method.

A further aspect of the present invention relates to a magnetic recording medium having a magnetic layer containing ferromagnetic powder and binder on a nonmagnetic support, wherein the magnetic powder is the above hexagonal ferrite powder.

A further aspect of the present invention relates to a method of manufacturing a magnetic recording medium, which includes:

manufacturing hexagonal ferrite powder by the above manufacturing method;

subjecting a mixture of the hexagonal ferrite powder that has been manufactured, organic solvent, and binder to a dispersion processing to prepare a magnetic layer-forming composition; and forming a magnetic layer with the magnetic layer-forming composition that has been prepared.

An aspect of the present invention can provide hexagonal ferrite powder with good dispersion in the presence of organic solvent and binder.

Other exemplary embodiments and advantages of the present invention may be ascertained by reviewing the present disclosure and the accompanying drawings.

BRIEF DESCRIPTION OF THE DRAWINGS

The present invention will be described in the following text by the exemplary, non-limiting embodiments shown in the drawing, wherein.

DETAILED DESCRIPTION OF THE EMBODIMENTS

Figure 1:
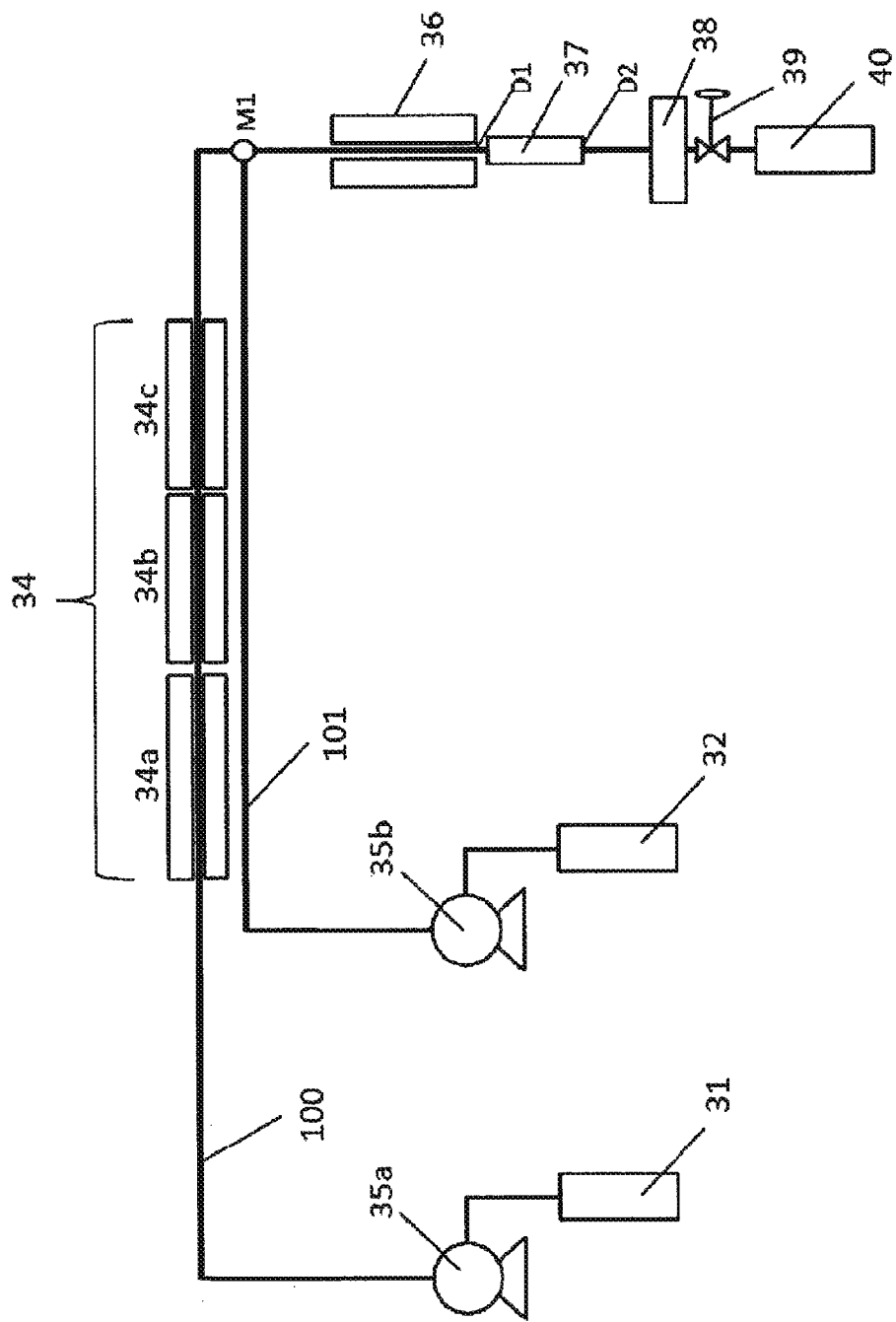
FIG. 1 is a schematic diagram of an example of a manufacturing apparatus that can be used to prepare hexagonal ferrite by the hydrothermal synthesis process.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about" Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Method of Manufacturing Hexagonal Ferrite Powder and Hexagonal Ferrite Powder

An aspect of the present invention relates to:

a method of manufacturing hexagonal ferrite powder, which includes:

preparing a hexagonal ferrite precursor by mixing an iron salt and a divalent metal salt in a water-based solution; and converting the hexagonal ferrite precursor into hexagonal ferrite within a reaction flow passage, within which a fluid flowing therein is subjected to heating and pressurizing, by continuously feeding a water-based solution containing the hexagonal ferrite precursor and gelatin to the reaction flow passage; and hexagonal ferrite powder that is manufactured by the above manufacturing method.

Details of the above manufacturing method and the above hexagonal ferrite powder will be described in detail below.

<Preparation of Hexagonal Ferrite Precursor>

(i) Starting Materials (Iron Salt, Divalent Metal Salt)

The hexagonal ferrite precursor (also referred to as "precursor" hereinafter) need only be one that converts to hexagonal ferrite (converts to ferrite) when placed in the presence of heated and pressurized water. Heated and pressurized water will also be referred to as high-temperature, high-pressure water (high-temperature high-pressure water) hereinafter. Details will be given further below. The precursor can exhibit high solubility in water and dissolve in the water-based solvent described further below, or can have poor solubility in water and can be dispersed (in sol form) as colloidal particles in the water-based solution.

Magnetoplumbite (M-type), W-type, Y-type, and Z-type crystal structures of hexagonal ferrite are known. The hexagonal ferrite obtained by the above manufacturing method can be of any crystal type. For example, M-type hexagonal ferrite not containing substitution atoms is a metal oxide denoted by $AFe_{12}O_{19}$. A denotes a divalent metal atom. The term "divalent metal atom" refers to a metal atom that is capable of becoming an ion in the form of a divalent cation. This includes alkaline earth metal atoms such as barium, strontium, and calcium, as well as lead and the like. The hexagonal ferrite may contain one or more substitution atoms that are substituted for a portion of the divalent metal atoms. When obtaining such hexagonal ferrite, it suffices to use a salt containing a substituent atom together with a divalent metal salt. Examples of atoms that can be substituted for divalent metal atoms are any of the atoms given further below. However, there is no limitation thereto.

The hexagonal ferrite precursor set forth above can be obtained by mixing an iron salt and a divalent metal salt in a water-based solution, desirably in a water-based solution containing a base. In this water-based solution, a salt containing iron atoms and divalent metal atoms (for example, a hydroxide) will precipitate in particle form, desirably as colloidal particles. The particles that precipitate out here can be subsequently placed in the presence of high-temperature, high-pressure water to convert them to ferrite and obtain hexagonal ferrite.

Salts of alkaline earth metals such as barium, strontium, and calcium, as well as lead salts can be employed as divalent metal salts. The type of divalent metal atom can be determined based on the desired hexagonal ferrite. For example, when barium ferrite is desired, a divalent metal salt in the form of a barium salt is employed. When strontium ferrite is desired, a strontium salt is employed. When mixed crystals of barium ferrite and strontium ferrite are desired, it suffices to employ divalent metal salts in the form of a barium salt and a strontium salt in combination. The salt is desirably a water-soluble salt. For example, hydroxides; halides such as chlorides, bromides, and iodides; and nitrates can be employed. Hydrates can also be employed.

Water-soluble salts of iron, such as halides such as chlorides, bromides, and iodides; nitrates; sulfates; carbonates; organic acid salts; and complexes can be employed as the iron salt. Hydrates can also be employed. The blending ratio and quantities added of the iron salt and divalent metal salt can be determined in accordance with the desired ferrite composition. In addition to an iron salt and a divalent metal salt, salts of optional atoms that are capable of constituting hexagonal ferrite along with iron atoms and divalent metal atoms can also be added. Examples of such optional atoms are Nb, Co, Ti, and Zn. The quantities of salts of these optional atoms that are added can be determined in accordance with the desired ferrite composition.

A hexagonal ferrite precursor containing the atoms that were contained in these salts will precipitate when the salts set forth above are mixed with a water-based solution desirably containing a base. Primarily, hydroxide ions ($OH^-$) in the water-based solution containing a base are thought to form a hydroxide sol with the iron ions contained in the iron salt and divalent metal ions contained in the divalent metal salt, thereby forming the precursor. The precursor that precipitates out here is subsequently converted to hexagonal ferrite (ferrite conversion).

(ii) Base

In the present invention, the base refers to one or more bases as defined by one or more among Arrhenius, Bronsted, or Lewis (Arrhenius bases, Bronsted bases, or Lewis bases).

Specific examples of bases are sodium hydroxide, potassium hydroxide, sodium carbonate, and ammonia water. However, there is no limitation thereto. Nor is there a limitation to inorganic bases; organic bases can also be employed.

Some of the salts that are added along with the base will sometimes exhibit acidity. Thus, when the water-based solution for preparing the precursor contains a base, the pH of the water-based solution is not limited to being alkaline, and will sometimes be neutral or acidic. The pH of the water-based solution is, for example, equal to or higher than 4 but equal to or lower than 14, as the pH at the liquid temperature during preparation of the precursor (during the reaction). From the perspective of getting the reaction to progress smoothly to prepare the precursor, equal to or higher than 5 but equal to or lower than 14 is desirable, equal to or higher than 6 but equal to or lower than 13 is preferred, and equal to or higher than 6 but equal to or lower than 12 is of still greater preference. Having a pH of equal to or higher than 7 or exceeding 7 (neutral to alkaline) is even more preferable. The temperature of the water-based solution during the reaction can be controlled by heating or cooling, or can be left unregulated at room temperature. The liquid temperature desirably falls within a range of 10 to 90° C. The reaction can progress adequately without temperature control (for example, at about 20 to 25° C.). To control the temperature, the reaction tank described further below can be equipped with heating or cooling means. The feed passage described further below can also be heated with a heating means or cooled with a cooling means to regulate the temperature.

(iii) Water-Based Solution

The water-based solution is a solution containing solvent in the form of ater-based solvent. The water-based solvent refers to solvent containing water. Water alone will do, as will a mixed solvent of water and organic solvent. The water-based solvent that is employed to prepare the precursor desirably comprises equal to or more than 50 weight percent of water, and is preferably water alone.

The organic solvent that can be employed in combination with water in the water-based solvent is desirably one that is miscible with water or that is hydrophilic. From this perspective, the use of a polar solvent is suitable. The term "polar solvent" refers to solvent that satisfies either having a dielectric constant of equal to or higher than 15 or having a solubility parameter of equal to or higher than 8. Desirable examples of organic solvent are alcohols, ketones, aldehydes, nitriles, lactams, oximes, amides, ureas, sulfides, sulfoxides, phosphoric acid esters, carboxylic acids, esters derived from carboxylic acids, carbonic acid or carbonic acid esters, and ethers.

(iv) Preparation of Hexagonal Ferrite Precursor

In one embodiment, the hexagonal ferrite precursor can be prepared in a reaction tank. The reaction tank employed can be a batch-type reaction tank or a continuous-type reaction tank. In a batch-type reaction tank, feeding and reacting of the starting materials and removal of the reaction product are conducted in separate steps. By contrast, in a continuous-type reaction tank, feeding and reacting of the starting materials and removal of the reaction product are conducted in parallel at least part of the time. Regardless of whether a batch-type or continuous-type reaction tank is being employed, the above components and water-based solution containing a water-based solvent are normally stirred and mixed by a known stirring means such as stirring vanes or a magnetic stirrer within the reaction tank. The various components such as starting materials and bases can be supplied to the reaction tank in solid form or in liquid form. From the perspective of achieving uniformity during mixing in the reaction tank, they are desirably added as liquids, such as in the form of water-based solutions obtained by dissolution or dispersion in suitable water-based solvents. It suffices to suitably set the concentration of the starting materials and bases in the water-based solutions. The various components can be simultaneously fed into the reaction tank or feeding can be sequentially started in some sequence.

In yet another embodiment, a water-based solution containing hexagonal ferrite precursor can be prepared in a continuous manufacturing process. Desirably, a feed passage to which a solution containing an iron salt and a divalent metal is being fed can be merged with a feed passage to which a base-containing water-based solution is being fed to form a mixed solution and thus prepare a water-based solution containing hexagonal ferrite precursor. The specific form of this preparation is described further below.

In one embodiment, the hexagonal ferrite precursor is prepared in the presence of gelatin. That is, gelatin is added to a water-based solution containing an iron salt and a divalent metal salt, desirably further containing a base, to prepare the precursor. Preparation in the presence of gelatin makes it possible to obtain a water-based solution containing precursor and gelatin, desirably to obtain a water-based solution containing precursor that contains gelatin. The gelatin that is employed here will be described in greater detail further below. From the perspective of further enhancing the dispersion of hexagonal ferrite powder in the presence of organic solvent and binder, the quantity of gelatin in this embodiment desirably falls within a range of 0.3 g/L to 35.0 g/L as a concentration of gelatin in the water-based solution containing an iron salt and a divalent metal.

<Mixing the Hexagonal Ferrite Precursor and Gelatin>

In the above manufacturing method, the water-based Solution containing hexagonal ferrite powder and gelatin is continuously fed to a reaction flow passage within which a fluid flowing therein is subjected to heating and pressurizing, and the hexagonal ferrite precursor is converted to hexagonal ferrite within this reaction flow passage. Accordingly, the precursor and gelatin are mixed prior to this conversion. An example of one form of mixing the precursor and gelatin, as set forth above, is for the precursor to be prepared in the presence of gelatin. The precursor-containing water-based solution thus obtained contains precursor and gelatin, and desirably contains precursor that contains gelatin. This embodiment will be referred to as Embodiment A below.

In an example of another embodiment, a feed passage to which high-temperature high-pressure water is being fed, a feed passage to which a water-based solution containing precursor is being fed, and a feed passage to which a water-based solution containing gelatin is being fed are sequentially merged, and the mixed flow obtained is introduced into the above reaction flow passage. This embodiment will be referred to as Embodiment B below.

In an example of another embodiment, the water-based solution containing precursor and the water-based solution containing gelatin are mixed, the mixed solution obtained is then introduced into a feed passage to which high-temperature high-pressure water is being fed, and the mixed flow thus obtained is introduced into the above reaction flow passage. This embodiment will be referred to as Embodiment C below.

Embodiments B and C also include forms in which the precursor is prepared in a continuous manufacturing process.

Embodiment A to C will be described with reference to the drawings below.

FIGS. 1 to 6 are schematic diagrams of examples of manufacturing apparatus that can be used to prepare hexagonal ferrite by the hydrothermal synthesis process. In particular, they are schematic diagrams of manufacturing apparatus that can be used to manufacture hexagonal ferrite powder by continuously conducting the hydrothermal synthesis process (in a continuous hydrothermal synthesis process).

Figure 2:
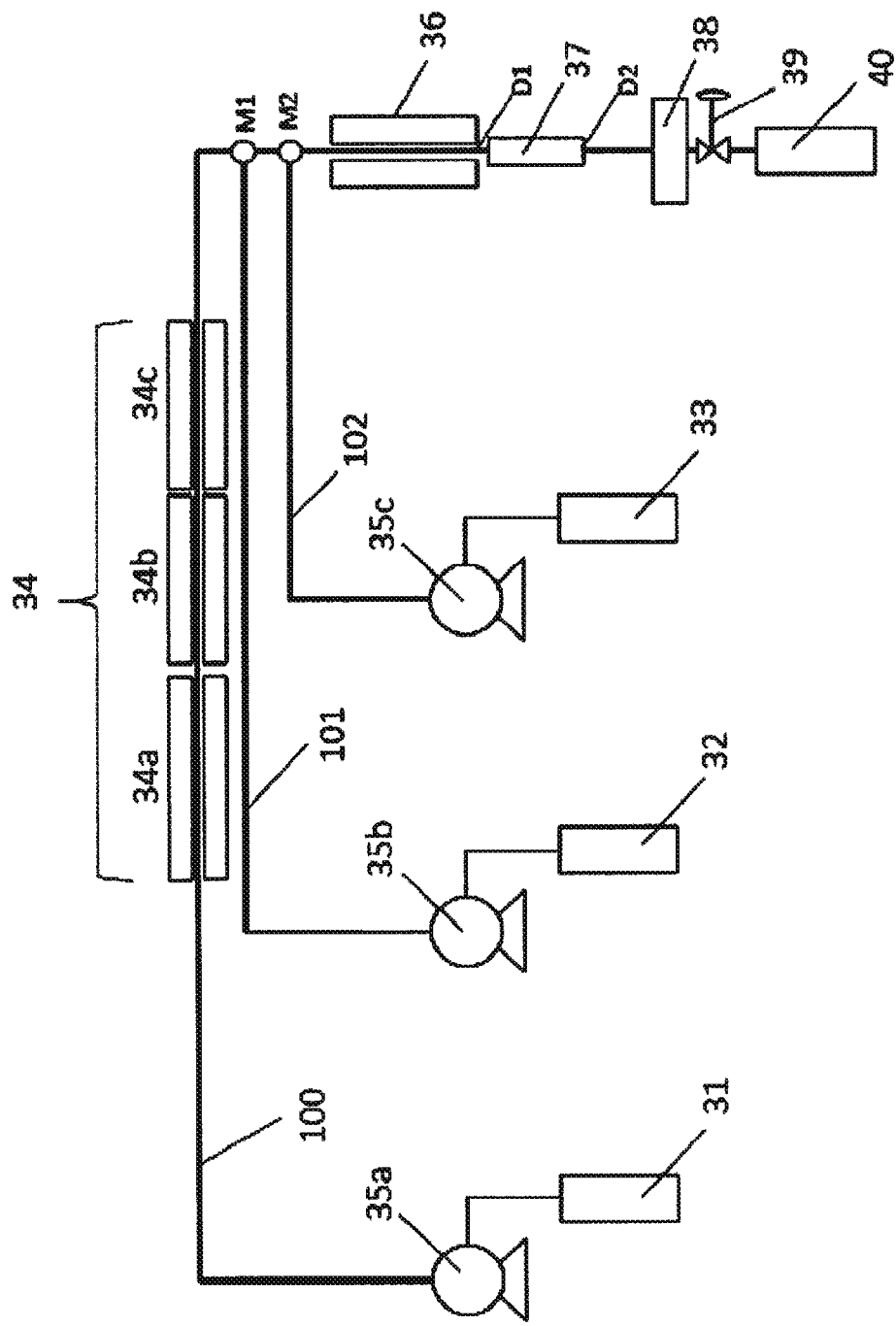
FIG. 2 is a schematic diagram of an example of a manufacturing apparatus that can be used to prepare hexagonal ferrite by the hydrothermal synthesis process.
Figure 3:
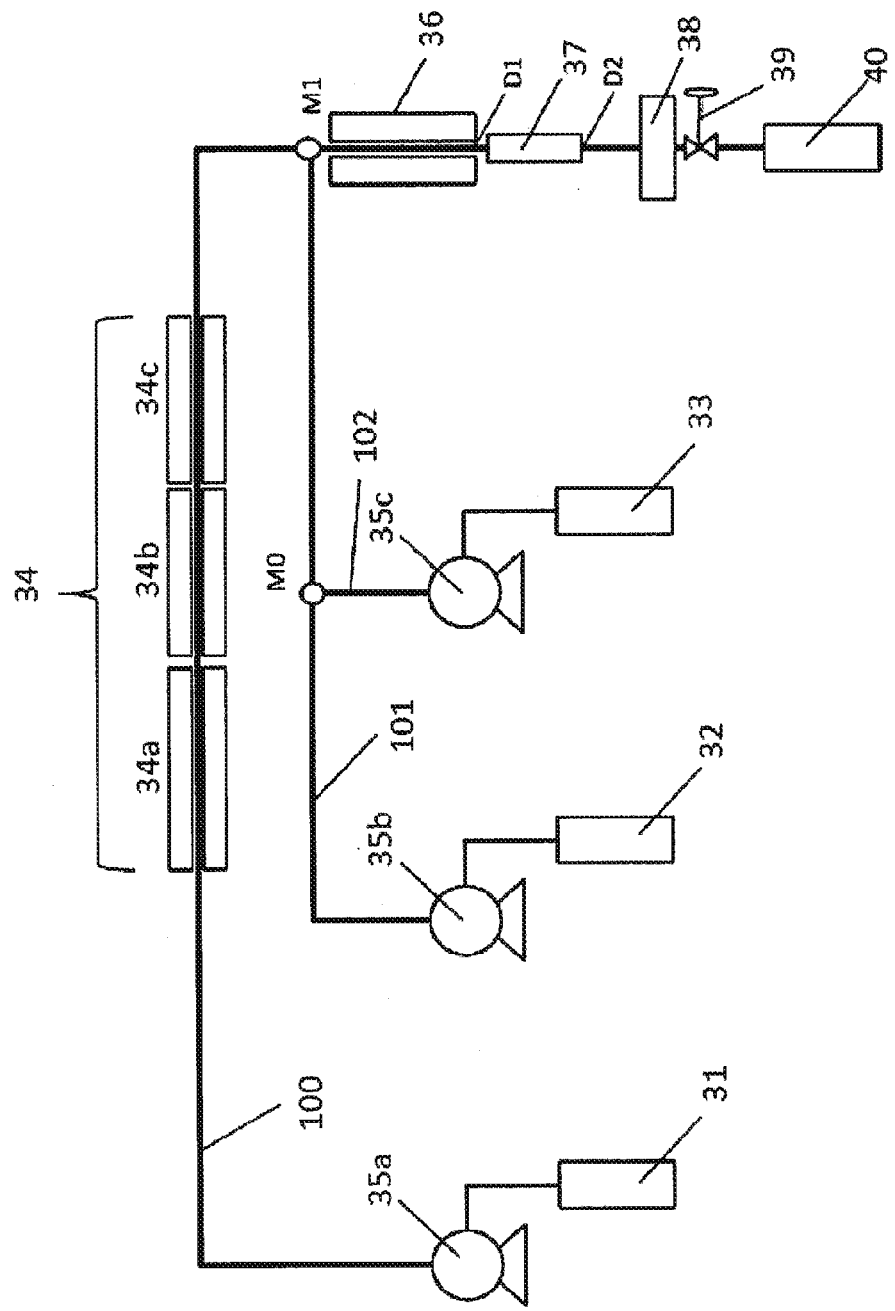
FIG. 3 is a schematic diagram of an example of a manufacturing apparatus that can be used to prepare hexagonal ferrite by the hydrothermal synthesis process.

More specifically, FIG. 1 is a schematic diagram of an example of a suitable manufacturing apparatus for Embodiment A. FIG. 2 is a schematic diagram of an example of a suitable manufacturing apparatus for Embodiment B. And FIG. 3 is a schematic diagram of an example of a suitable manufacturing apparatus for Embodiment C.

Figure 4:
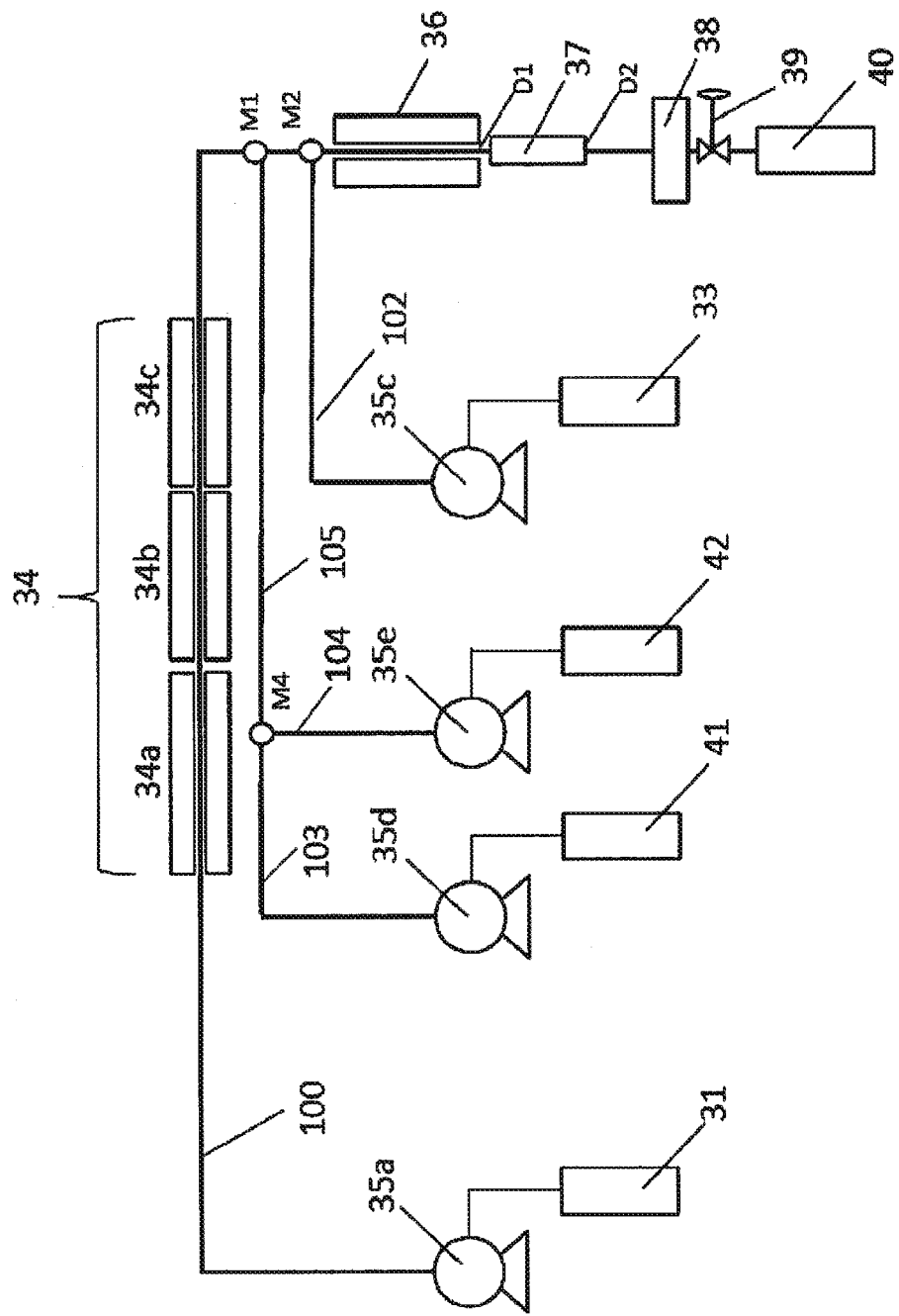
FIG. 4 is a schematic diagram of an example of a manufacturing apparatus that can be used to prepare hexagonal ferrite by the hydrothermal synthesis process.
Figure 5:
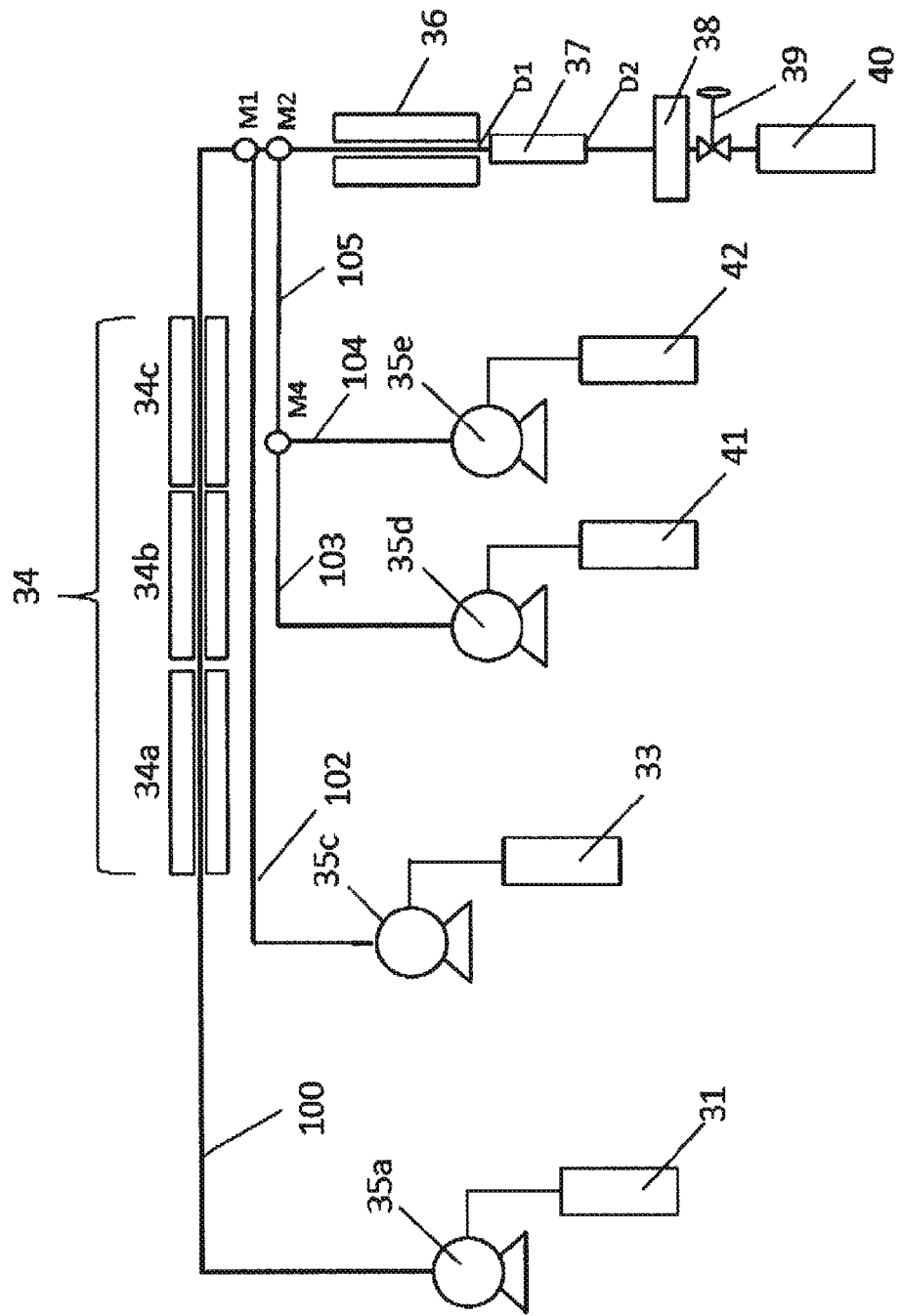
FIG. 5 is a schematic diagram of an example of a manufacturing apparatus that can be used to prepare hexagonal ferrite by the hydrothermal synthesis process.
Figure 6:
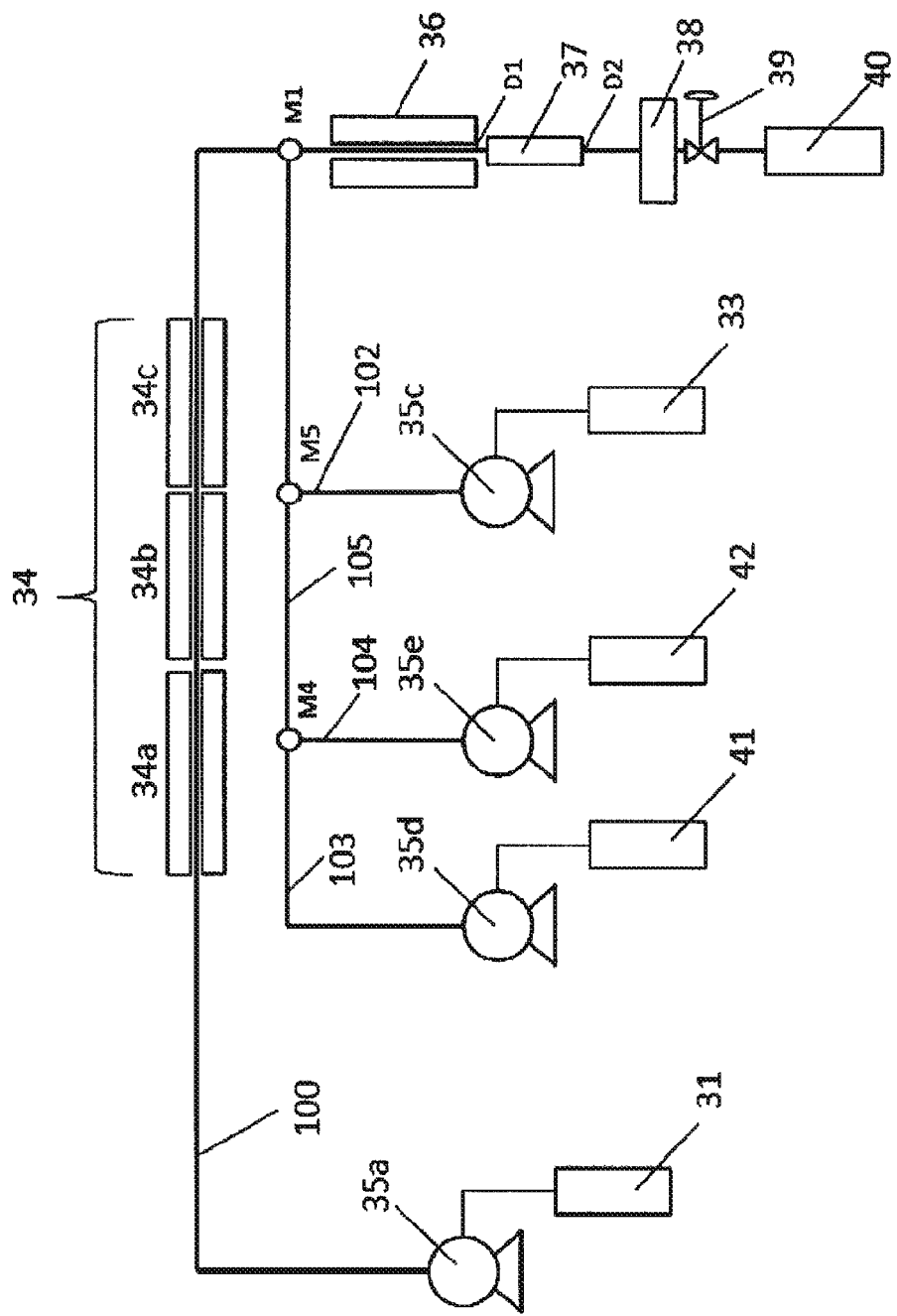
FIG. 6 is a schematic diagram of an example of a manufacturing apparatus that can be used to prepare hexagonal ferrite by the hydrothermal synthesis process.

FIGS. 4 and 5 are schematic diagrams of examples of manufacturing apparatus that are suitable to embodiments where the precursor (water-based solution containing precursor) is prepared by a continuous manufacturing process in Embodiment B. FIG. 6 is a schematic diagram of an example of a manufacturing apparatus that is suited to an embodiment where the precursor (water-based solution containing precursor) is prepared by a continuous manufacturing process in Embodiment C.

In FIGS. 1 to 6, identical structural elements are denoted by identical symbols.

A description will be given with reference to of the example of FIG. 1. The manufacturing apparatus shown in FIG. 1 includes liquid tanks 31 and 32, heating means 34 (34a to 34c), pressurizing and feeding means 35a and 35b, a reaction flow passage 36, a cooling element 37, a filtering means 38, a pressure regulating valve (back pressure valve) 39, and a recovery element 40. Fluid is fed from each of the liquid tanks to feed passage 100 and flow passage 101. In the drawing, there are three heating means. However, this is merely an example, and there is no limitation thereto.

The manufacturing apparatus shown in FIGS. 2 and 3 include, in addition to the above structure, a liquid tank 33, a pressurizing and feeding means 35c, and a flow passage 102.

The manufacturing apparatus shown in FIGS. 4, 5, and 6 include liquid tanks 41 and 42, pressurizing and feeding means 35d and 35e, and flow passages 103, 104, and 105 in addition to the above structure.

In one embodiment, water such as purified water or distilled water is introduced to liquid tank 31, precursor-containing water-based solution (which further contains gelatin in Embodiment A) is introduced to liquid tank 32, and gelatin-containing water-based solution is introduced to liquid tank 33. The water that is introduced to liquid tank 31 is fed within feed passage 100 while being pressurized by pressurizing and feeding means 35a, and is heated by heating means 34. This heating and pressurizing is conducted to put the water in a state of high temperature and high pressure, and is desirably conducted to put the water in a subcritical to supercritical state. Since water in a subcritical to supercritical state can exhibit extremely high reactivity, contact with water in such a state instantaneously can place the hexagonal ferrite precursor in a highly reactive state. This can be done to cause it to undergo conversion to ferrite early on. Generally, heating the water to greater than or equal to 200° C. and pressurizing it to greater than or equal to 20 MPa will put it in a subcritical to supercritical state. Accordingly, the above heating and pressurizing of the water is desirably conducted to a temperature of greater than or equal to 200° C. and a pressure of greater than or equal to 20 MPa. The high-temperature high-pressure water that has been heated and pressurized is fed into feed passage 100, arriving a mixing element M1.

In Embodiment A (FIG. 1), the water-based solution containing hexagonal ferrite precursor and gelatin is fed from liquid tank 32 to pipe 101 by pressurizing and feeding means 35b, and merges with feed passage 100, to which high-temperature high-pressure water is being fed, in mixing element M1.

In Embodiment B (FIG. 2), hexagonal ferrite precursor-containing water-based solution is fed from liquid tank 32 to flow passage 101 by pressurizing and feeding means 35b and merges with feed passage 100, to which high-temperature high-pressure water is being fed, in mixing element M1. Subsequently, the mixed flow of high-temperature high-pressure water and hexagonal ferrite precursor-containing water-based solution merges in mixing element M2 with gelatin-containing water-based solution that has been fed from liquid tank 33 to flow passage 102 by pressurizing and feeding means 35c. In Embodiment B, in contrast to the above example, it is also possible to introduce gelatin-containing water-based solution into liquid tank 32 and hexagonal ferrite precursor-containing water-based solution into liquid tank 33.

In Embodiment C (FIG. 3), hexagonal ferrite precursor-containing water-based solution is fed from liquid tank 32 to flow passage 101 by pressurizing and feeding means 35b and merges in mixing element M0 with gelatin-containing water-based solution that is being fed from liquid tank 33 to flow passage 102 by pressurizing and feeding means 35c. Subsequently, the mixed flow of hexagonal ferrite precursor-containing water-based solution and gelatin-containing water-based solution passes through flow passage 101 and merges with high-temperature high-pressure water in mixing element M1.

The manufacturing apparatus shown in FIGS. 4 and 5 are suited to embodiments in which the hexagonal ferrite precursor-containing solution is also prepared in a continuous manufacturing process in Embodiment B. In the manufacturing apparatus shown in FIGS. 4 and 5, a solution containing an iron salt and a divalent metal salt (also referred to hereinafter as a starting material solution) is introduced to liquid tank 41 and a base-containing water-based solution (normally not containing an iron salt or divalent metal salt) is introduced to liquid tank 42. Starting material solution that has been fed from liquid tank 41 to pipe 103 by pressurizing and feeding means 35d and base-containing water-based solution that has been fed from liquid tank 42 to pipe 104 by pressurizing and feeding means 35e merge in mixing element M4. As the reverse of the above example, it is also possible to introduce base-containing water-based solution to liquid tank 41 and starting material solution to liquid tank 42.

In the manufacturing apparatus that is shown in FIG. 4, the mixed flow that has been thus obtained passes over flow passage 105 and merges in mixing element M1 with high-temperature high-pressure water that has been fed from liquid tank 31 to flow passage 100 by pressurizing and feeding means 35a and heated by heating means 34. Further, the mixed flow that has been thus obtained merges in mixing element M2 with gelatin-containing water-based solution that has been fed from liquid tank 33 to flow passage 102 by pressurizing and feeding means 35c.

In the manufacturing apparatus shown in FIG. 5, the mixed flow that has been thus obtained passes over flow passage 105 and merges in mixing element M2 with the mixed flow that has been obtained by merging in mixing element M1 the high-temperature high-pressure water that has been fed from liquid tank 31 to flow passage 100 by pressurizing and feeding means 35a and heated by heating means 34 and the gelatin-containing water-based solution that has been fed from liquid tank 33 to flow passage 102 by pressurizing and feeding means 35c.

In the manufacturing apparatus shown in FIGS. 4 and 5, the details of the subsequent steps are as described for the manufacturing apparatus shown in FIG. 2.

The manufacturing apparatus shown in FIG. 6 is suited to an embodiment in which the hexagonal ferrite precursor-containing water-based solution is also prepared in a continuous manufacturing process in Embodiment C. In the manufacturing apparatus shown in FIG. 6, solution containing an iron salt and a divalent metal salt (starting material solution) is introduced to liquid tank 41 and base-containing water-based solution (normally containing neither an iron salt nor a divalent metal salt) is introduced to liquid tank 42. Starting material solution that has been fed from liquid tank 41 to pipe 103 by pressurizing and feeding means 35*d* and base-containing water-based solution that has been, fed from liquid tank 42 to pipe 104 by pressurizing and feeding means 35*e* are merged in mixing element M4. As the reverse of the above example, it is also possible to introduce base-containing water-based solution to liquid tank 41 and starting material solution to liquid tank 42.

The mixed flow that has been thus obtained is merged in mixing element M5 of flow passage 105 with the gelatin-containing water-based solution that has been fed from liquid tank 33 to pipe 102 by pressurizing and feeding means 35*c*. Further, the mixed flow thus obtained is merged in mixing element M1 with the high-temperature high-pressure water that has been fed from liquid tank 31 to flow passage 100 by pressurizing and feeding means 35*a* and heated by heating means 34.

The details of the subsequent steps are identical to those set forth for the manufacturing apparatus shown in FIG. 3 above.

Following mixing in the mixing element, the mixed flow of high-temperature high-pressure water, hexagonal ferrite precursor, and gelatin (the water-based solution which contains the hexagonal ferrite precursor, gelatin, and water) passes over feed passage 100 and is fed to reaction flow passage 36. In reaction flow passage 36, the mixed flow is heated and further pressurized by pressurizing means 35*a* to put the water contained in the mixed flow within reaction flow passage 36 into a high-temperature high-pressure state, desirably a subcritical to supercritical state, and the conversion of hexagonal ferrite precursor to ferrite advances. Subsequently, the solution within which the hexagonal ferrite precursor has been converted to ferrite and which contains particles of hexagonal ferrite is discharged through discharge outlet D1. The discharged solution is fed to cooling element 37 and cooled within cooling element 37. Subsequently, it passes through discharge outlet D2 and the particles of hexagonal ferrite are captured by a filtering means (such as a filter) 38. The particles of hexagonal ferrite that have been captured by filtering means 38 are released by filtering means 38, pass through pressure regulating valve 39, and are recovered by recovery element 40.

In heating and pressurizing within reaction flow passage 36, by heating the reaction system in which water is present to greater than or equal to 300° C. and pressurizing it to greater than or equal to 20 MPa, the water can be put in a subcritical to supercritical state, creating a highly reactive reaction field. Placing hexagonal ferrite precursor under these conditions can cause the ferrite conversion to progress rapidly, making it possible to obtain hexagonal ferrite magnetic particles. Accordingly, the heating temperature is desirably one at which the mixed flow within the reaction flow passage reaches greater than or equal to 300° C. The heating temperature is preferably set so that the temperature of the water-based solution that is discharged from the reaction flow passage and fed to the cooling element is greater than or equal to 350° C. but less than or equal to 450° C. Here, the liquid temperature refers to the temperature at the discharge outlet (discharge outlet D1 of the apparatus shown in FIGS. 1 to 6) of the reaction flow passage. From the perspective of enhancing the magnetic characteristics of the hexagonal ferrite powder obtained, it is desirable to conduct the reaction converting hexagonal ferrite precursor to hexagonal ferrite within the reaction flow passage under the temperature conditions falling within the above range of the liquid temperature at the reaction flow passage discharge outlet. The present inventor presumes that this is due to improvement in the crystallinity of the hexagonal ferrite powder. The above liquid temperature is preferably greater than or equal to 360° C. but less than or equal to 430° C., more preferably greater than or equal to 380° C. but less than or equal to 420° C. The pressure that is applied to the mixed flow within the reaction flow passage is desirably greater than or equal to 20 MPa, preferably falling within a range of 20 MPa to 50 MPa.

As set forth above, the water-based solution that is discharged from the reaction flow passage is cooled in the cooling element. The cooling in the cooling element can completely stop the reaction converting hexagonal ferrite precursor into hexagonal ferrite. This is desirable in order to obtain hexagonal ferrite powder with little variation in particle size. From this perspective, the cooling in the cooling element is desirably conducted so that the temperature of the water-based solution in the cooling element reaches less than or equal to 100° C., preferably reaching greater than or equal to room temperature (about 20° C. to 25° C.) but less than or equal to 100° C. The cooling can be conducted, for example, by a known cooling means such as a water cooling apparatus that cools the interior by circulating cold water. The same pressure as in the feed passage and reaction feed passage is normally applied to the water-based solution within the cooling element.

In the manufacturing method set forth above, it is desirable to employ high pressure-use metal piping as the feed passages and flow passages (also referred to as "piping" hereinafter) to apply pressure to the fluids that are fed through the interior. The metal constituting the piping is desirably SUS316, SUS 304, or some other stainless steel, or a nickel-based alloy such as Inconel (Japanese registered trademark) or Hastelloy (Japanese registered trademark) because of their low-corrosion properties. However, there is no limitation thereto. Equivalent or similar materials can also be employed. The piping of laminate structure described in Japanese Unexamined Patent Publication (KOKAI) No. 2010-104928, which is expressly incorporated herein by reference in its entirety, can also be employed.

In the manufacturing devices shown in FIGS. 1 to 6, the various mixing elements have structures such that pipes are joined by T-joints. The reactors described in Japanese Unexamined Patent Publication (KOKAI) Nos. 2007-268503, 2008-12453, 2010-75914, and the like, which are expressly incorporated herein by reference in their entirety, can be employed as the mixing elements. The material of the reactor is desirably the material described in Japanese Unexamined Patent Publication (KOKAI) No. 2007-268503, 2008-12453, or 2010-75914, which are expressly incorporated herein by reference in their entirety. Specifically, the metals set forth above as being suitable for constituting piping are desirable. However, there is no limitation thereto, and equivalent or similar materials can be employed. Combination with low-corrosion titanium alloys, tantalum alloy, ceramics and the like is also possible.

Specific embodiments of the method of manufacturing hexagonal ferrite powder according to one aspect of the present invention have been set forth above. However, the present invention is not limited to these specific embodiments. For example, embodiments in which the gelatin is present during preparation of the hexagonal ferrite precursor or in which the hexagonal ferrite precursor and gelatin are mixed after preparation have been set forth. However, it is also possible for the gelatin to be present during preparation of the hexagonal ferrite precursor and for the gelatin to be mixed with the hexagonal ferrite precursor after preparation.

<Gelatin>

The gelatin that is employed in the above manufacturing method will be described next.

As set forth above, the term "gelatin" refers to a hydrolysis product of collagen. The derivation of the collagen is not specifically limited. In the above manufacturing method, various hydrolysis products of animal-derived collagen can be employed. As stated above, the weight average molecular weight of the gelatin falls within a range of from 10,000 to 200,000. From the perspective of obtaining hexagonal ferrite powder exhibiting good dispersion in the presence of organic solvent and binder, the weight average molecular weight of the gelatin is desirably greater than or equal to 20,000, preferably greater than or equal to 30,000. From the perspective of ease of handling, the molecular weight of the gelatin is desirably less than or equal to 180,000, preferably less than or equal to 150,000. Gelatins exist in the form of acid-treated gelatins obtained by hydrolyzing collagen in the presence of an acid, alkali-treated gelatins obtained by hydrolysis in the presence of a base, enzyme-treated gelatins obtained by hydrolysis by a hydrolyzing enzyme, and gelatins obtained by further hydrolyzing and/or modifying these gelatins. Examples of gelatins that have been subjected to modification treatments are various modified gelatins obtained by chemical modification with amino groups, such as benzoylated gelatins, phthalylated gelatins, trimellitated gelatin, succinylated gelatin, sulfonated gelatins (such as gelatins obtained by modification treatment with propanesultone or butanesultone), and acetylated gelatins. It is possible to employ gelatins into which two or more functional groups have been introduced by chemical modification. For example, following selective modification with an amino group, an oxidizing agent can be added to oxidize a thioether group and obtain a modified gelatin. Alternatively, following oxidation of a thioether group, amino group modification can be conducted to obtain a modified gelatin. Further, following amino group modification, modification can be performed with one or more imidazole groups, guanidyl groups, are hydroxyl groups to obtain modified gelatin. In the above manufacturing method, it is possible to mix two or more different types of gelatin for use. When employing two or more types of gelatin, the gelatin content and gelatin concentrations that are given above and further below are given in the form of the total of the two or more types of gelatin. The same applies to the contents and concentrations of other components. The gelatin can be prepared by known methods and is also available in the form of commercial products.

When employing gelatin in the form of a gelatin-containing water-based solution in the manner of Embodiments B and C, from the perspective of further enhancing the dispersion of hexagonal ferrite powder in the presence of organic solvent and binder, the gelatin concentration in the gelatin-containing water-based solution desirably falls within a range of 0.3 g/L to 35.0 g/L. The gelatin concentration in Embodiment A is as set forth above. Reference can be made to the above description for the water-based solvent for use in preparing the gelatin-containing water-based solution. Water is desirably employed as the solvent in preparing the gelatin-containing water-based solution.

Hexagonal ferrite powder containing gelatin can be obtained by the manufacturing method set forth above. As stated above, the fact that the functional groups present in the gelatin can be modified by being placed in the presence of heated and pressurized water (high-temperature high-pressure water) is thought to contribute to the fact that the hexagonal ferrite powder obtained by the manufacturing method set forth above can exhibit good dispersion in the presence of organic solvent and binder.

<Hexagonal Ferrite Powder>

The hexagonal ferrite powder that is manufactured by the above manufacturing method will be further described next.

(Gelatin Content)

The hexagonal ferrite (hexagonal ferrite powder) that is obtained by the conversion of hexagonal ferrite precursor in the presence of gelatin by the manufacturing method set forth above desirably contains 1.0 weight % to 60.0 weight % of gelatin, and preferably contains 3.0 weight % to 30.0 weight % of gelatin. As set forth above, the gelatin that is contained in the hexagonal ferrite powder will sometimes fail to satisfy one or more of (1) to (3) set forth above due to having been modified.

(Average Particle Size)

The average particle size of the hexagonal ferrite powder desirably falls within a range of 0.5 nm to 30 nm, preferably a range of 5 nm to 20 nm. Hexagonal ferrite powder having an average particle size that falls within the above range is suitable as ferromagnetic powder in magnetic recording media for high-density recording. It is desirable to use gelatin in the manufacturing method set forth above to obtain hexagonal ferrite powder having an average particle size falling within the above range.

The average particle size of the ferromagnetic powder is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and in the present specification, the average particle size of the powder, such as ferromagnetic powder and various kinds of powder, is the average particle size as obtained by the above method. The average particle size indicated in Examples further below was obtained using a Model H-9000 transmission electron microscope made by Hitachi and KS-400 image analysis software made by Carl Zeiss.

In the present invention and in the present specification, the term "ferromagnetic powder" means an aggregation of multiple ferromagnetic particles. The term "aggregation" is not limited to a state in which the constituent particles are in direct contact, but includes states in which binder, additives, and the like are present between the individual particles. The same applies to other powders, such as the nonmagnetic powder. The term "particle" is also sometimes used to denote powder.

The average particle size set forth above can be obtained by observing the powder that is present as powder by a transmission electron microscope. A measurement sample of the powder that is contained in a magnetic recording medium can be obtained by collecting powder from the magnetic recording medium. The measurement sample of hexagonal ferrite powder can be collected, for example, from a magnetic layer by the following method.

1. Subjecting the surface of the magnetic layer to 1 to 2 minutes of surface treatment with a plasma reactor made by Yamato Scientific Co., Ltd., and ashing the organic components (binder, curing agent and the like) of the surface of the magnetic layer to remove them.

2. Adhering filter paper that has been immersed in an organic solvent such as cyclohexanone or acetone to the edge portion of a metal rod, rubbing the surface of the magnetic layer that has been treated as in 1. above on it, and transferring the magnetic layer component from the magnetic layer to the filter paper to separate it.

3. Shaking off the component separated by 2. above in a solvent such as cyclohexanone or acetone (placing each piece of filter paper in solvent and using an ultrasonic disperser to shake it off), drying the solvent, and removing the separated component.

4. Placing the component that has been scraped off in 3. above in a glass test tube that has been thoroughly cleaned, adding n-butyl amine to about 20 mL of the magnetic layer component, and sealing the glass test tube. (The n-butyl amine is added in a quantity adequate to decompose the remaining binder or the like that has not been ashed.)

5. The glass test tube is heated for equal to or more than 20 hours at 170° C. to decompose the organic component.

6. The precipitate following the decomposition of 5. above is thoroughly washed with pure water and dried, and the powder is recovered.

7. A neodymium magnet is placed near the powder that has been collected in 6. and the powder that is attracted (that is, hexagonal ferrite powder) is collected.

Hexagonal ferrite powder can be collected from the magnetic layer by the above steps. Since the above processing can impart almost no damage to the particles, the above method permits measurement of the particle size of powder in the state in which it was contained in the magnetic layer.

In the present invention and in the present specification, the size of the particles constituting powder such as ferromagnetic powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

(Coefficient of Variation in Particle Size)

The coefficient of variation in particle size is determined by calculating the standard deviation of the particle size of 500 particles determined by the method set forth above, and dividing the standard deviation by the average particle size. The coefficient of variation in particle size of the hexagonal ferrite powder desirably falls within a range of 5% to 35%, preferably within a range of 5% to 30%. The coefficient of variation in particle size is an indicator of the particle size distribution. The lower the value, the narrower the particle size distribution indicated. Hexagonal ferrite powder with a narrow particle size distribution is desirable because there are few components on the fine particle end of the particle size distribution that tend to be affected by thermal fluctuation and few components on the coarse particle end of the particle distribution that impart noise. The use of gelatin in the above manufacturing method is desirable to obtain hexagonal ferrite powder with a coefficient of variation in particle size that falls within the range given above.

Since the above hexagonal ferrite powder can disperse well in the presence of organic solvent and binder, it is desirably employed as magnetic recording-use magnetic powder in the preparation of the magnetic layer-forming composition. Using the above hexagonal ferrite powder makes it possible to shorten the preparation period of the magnetic layer-forming composition (dispersion period of the hexagonal ferrite powder), thereby enhancing the efficiency of magnetic recording medium production.

Further, using hexagonal ferrite powder that disperses well in the presence of organic solvent and binder can increase the level of dispersion of the hexagonal ferrite powder in the magnetic layer-forming composition. Forming a magnetic layer employing a magnetic layer-forming composition in which hexagonal ferrite powder has been dispersed to a high degree makes it possible to provide a magnetic recording medium with a highly smooth surface.

Magnetic Recording Medium and Method of Manufacturing Magnetic Recording Medium

An aspect of the present invention relates to:

a magnetic recording medium having a magnetic layer containing ferromagnetic powder and binder on a nonmagnetic support, wherein the magnetic powder is the above hexagonal ferrite powder; and a method of manufacturing a magnetic recording medium, which includes:

manufacturing hexagonal ferrite powder by the above manufacturing method;

subjecting a mixture of the hexagonal ferrite powder that has been manufactured, organic solvent, and binder to a dispersion processing to prepare a magnetic layer-forming composition; and forming a magnetic layer with the magnetic layer-forming composition that has been prepared.

The above magnetic recording medium and manufacturing method will be described in greater detail below.

<Magnetic Layer>

Details of the ferromagnetic powder (hexagonal ferrite powder) that is employed in the magnetic layer are as set forth above.

The magnetic layer contains ferromagnetic powder and binder. Polyurethane resins, polyester resins, polyamide resins, vinyl chloride resins, acrylic resins such as those provided by copolymerizing styrene, acrylonitrile, methyl methacrylate and the like, cellulose resins such as nitrocellulose, epoxy resins, phenoxy resins, polyvinylacetal, polyvinylbutyral, and other polyvinyl alkylal resins can be employed singly, or as mixtures of multiple resins, as the binder contained in the magnetic layer. Among these, desirable resins are polyurethane resin, acrylic resins, cellulose resins, and vinyl chloride resins. These resins can also be employed as binders in the nonmagnetic layer described further below. Reference can be made to paragraphs 0029 to 0031 of Japanese Unexamined Patent Publication (KOKAI) No. 2010-24113, which is expressly incorporated herein by reference in its entirety, with regard to the above binders. Polyisocyanate curing agents can also be employed with the above resins.

Additives can be added as needed to the magnetic layer. Examples of additives are abrasives, lubricants, dispersing agents, dispersion adjuvants, antifungal agents, antistatic agents, oxidation inhibitors, and carbon black. The additives set forth above can be suitably selected for use from among commercial products based on the properties desired.

<Nonmagnetic Layer>

Details of the nonmagnetic layer will be described in detail next. The magnetic recording medium of an aspect of the present invention can have the magnetic layer directly on a nonmagnetic support, or can include a nonmagnetic layer containing nonmagnetic powder and binder between the nonmagnetic support and the magnetic layer. The nonmagnetic powder that is employed in the nonmagnetic layer can be an organic or an inorganic material. Carbon black and the like can also be employed. Examples of inorganic materials are metals, metal oxides, metal carbonates, metal sulfates, metal nitrides, metal carbides, and metal sulfides. Nonmagnetic powders of these materials are available as commercial products and can be manufactured by known methods. For details, reference can be made to Japanese Unexamined Patent Publication (KOKAI) No. 2010-24113, paragraphs 0036 to 0039.

The binders, lubricants, dispersing agents, additives, solvents, dispersion methods, and the like of the magnetic layer are also suitable for use for the nonmagnetic layer. Techniques that are known for magnetic layers can also be applied to the quantity and type of binder, the quantities and types of additives and dispersing agents added, and the like. Carbon black and organic material powders can also be added to the nonmagnetic layer. In this regard, by way of example, reference can be made to Japanese Unexamined Patent Publication (KOKAI) No. 2010-24113, paragraphs 0040 to 0042.

<Nonmagnetic Support>

Examples of nonmagnetic supports are known supports such as biaxially stretched polyethylene terephthalate, polyethylene naphthalate, polyamide, polyamide-imide, and aromatic polyamide. Among these, polyethylene terephthalate, polyethylene naphthalate, and polyamide are desirable.

These supports can be subjected in advance to corona discharge, plasma treatment, adhesion-enhancing treatment, heat treatment, or the like.

<Thickness of Nonmagnetic Support and Each Layer>

With regard to the thickness structure of the nonmagnetic support and various layers, the thickness of the nonmagnetic support is desirably 3 μm to 80 μm. The thickness of the magnetic layer can be optimized based on the amount of saturation magnetization of the magnetic head employed, the length of the head gap, and the bandwidth of the recording signal. Generally, it can be 0.01 μm to 0.15 μm, desirably 0.02 μm to 0.12 μm, and preferably, 0.03 μm to 0.10 μm. It suffices for the magnetic layer to be comprised of a least one layer, but it can separated into two or more layers having different magnetic characteristics. The structures of known multilayer magnetic layers can be applied.

The thickness of the nonmagnetic layer is for example 0.1 μm to 3.0 μm, desirably 0.3 μm to 2.0 μm, and preferably 0.5 μm to 1.5 μm. The nonmagnetic layer of the above magnetic recording medium includes an essentially nonmagnetic layer containing trace quantities of ferromagnetic powder, for example, either as impurities or intentionally, in addition to the nonmagnetic powder. The essentially nonmagnetic layer means a layer exhibiting a residual magnetic flux density of equal to or less than 10 mT, a coercive force of equal to or less than 7.96 kA/m (100 Oe), or a residual magnetic flux density of equal to or less than 10 mT and a coercive force of equal to or less than 7.96 kA/m (100 Oe). The nonmagnetic desirably has no residual magnetic flux density or coercive force.

<Backcoat Layer>

A backcoat layer can be provided on the opposite surface of the nonmagnetic support from that on which the magnetic layer is present in the magnetic recording medium. The backcoat layer desirably comprises carbon black and inorganic powder. The formula of the magnetic layer and nonmagnetic layer can be applied to the binder and various additives used to form the backcoat layer. The thickness of the back coat layer is desirably equal to or less than 0.9 μm, preferably 0.1 μm to 0.7 μm.

<Manufacturing Process>

The process of manufacturing the composition for forming the magnetic layer, nonmagnetic layer, or backcoat layer normally includes at least a kneading step, dispersing step, and mixing steps provided as needed before and after these steps. The various steps can each be divided into two or more steps. All of the starting materials employed in the present invention, such as ferromagnetic powder, nonmagnetic powder, binder, carbon black, abrasives, antistatic agents, lubricants, and solvents, can be added either initially during the step or part way through. Any individual starting material can be divided for addition in two or more steps. For example, binder can be divided up and added during a kneading step, dispersing step, or mixing step following dispersion to adjust the viscosity. In an aspect of the present invention, conventionally known manufacturing techniques can be employed for some of the steps. In the kneading step, it is desirable to employ an apparatus with powerful kneading strength in the kneading step, such as an open kneader, continuous kneader, pressurizing kneader, or extruder. Details on these kneading treatments are described in Japanese Unexamined Patent Publication (KOKAI) Heisei No. 1-106338 and Heisei No. 1-79274, which are expressly incorporated herein by reference in their entirety.

The magnetic layer-forming composition containing the above hexagonal ferrite powder can be prepared through a process of subjecting a mixture containing the hexagonal ferrite powder, organic solvent, and binder to a dispersion processing. One or more of the various solvents that are commonly employed to manufacture magnetic recording media can be employed as the organic solvent. By way of example, reference can be made to Japanese Unexamined Patent Publication (KOKAI) No. 2011-2161.49, paragraph 0153, with regard to organic solvents. The above publication is expressly incorporated herein by reference in its entirety. The above hexagonal ferrite powder can disperse well in the presence of organic solvent and binder. Thus, the dispersion time can be shortened, enhancing the efficiency of magnetic recording medium production.

Glass heads can be used to disperse the magnetic layer-forming composition, nonmagnetic layer-forming composition, or back coat layer-forming composition. High specific gravity dispersion beads in the form of zirconia beads, titania heads, and steel beads are also suitable. The particle diameter and fill rate of these dispersion beads can be optimized for use. A known disperser can be employed.

By way of example, reference can be made to Japanese Unexamined Patent Publication (KOKAI) No. 2010-24113, paragraphs 0051 to 0057, for details on the process of manufacturing a magnetic recording medium.

EXAMPLES

The present invention will be described in greater detail below through Examples. However, the present invention is not limited to the embodiments shown in Examples. The "parts" and "%" indicated below denote "weight parts" and "weight %," respectively. Unless specifically stated otherwise, the processes and evaluations set forth below were conducted in air at 23° C.±1° C.

Details regarding the gelatin employed in Examples and Comparative Examples are given in Table 1. The weight average molecular weight indicated below is a value measured by the method set forth above. The gelatins indicated in Table 1 were confirmed to possess the properties (solubility in water and gelling ability) described in (2) and (3) above by the methods set forth above.

TABLE 1

|  | Type | Weight average molecular weight |
| --- | --- | --- |
| Gelatin 1 | Acid-treated gelatin | 100,000 |
| Gelatin 2 | Trimellitated gelatin | 120,000 |
| Gelatin 3 | Phthalylated gelatin | 100,000 |
| Gelatin 4 | Acid-treated gelatin | 30,000 |
| Gelatin 5 | Acid-treated gelatin | 180,000 |

Example 1-1

(1) Preparation of Precursor-Containing Aqueous Solution

Precursor was prepared in the presence of gelatin by the following method in a batch-type reaction tank equipped with stirring vanes yielding a precursor-containing aqueous solution.

Acid-treated gelatin 1 (1.5 g/L), barium hydroxide (Ba(OH)$_2$.8H$_2$O), and iron(III) nitrate (Fe(NO$_3$)$_3$.9H$_2$O) were dissolved in purified water in a reaction tank. Potassium hydroxide KOH was added dropwise (dropwise addition rate: 10 cm$^3$/minute) to the reaction tank to raise the aqueous solution in the reaction tank to pH 9 and a hydroxide sol (precursor-containing aqueous solution) was prepared. The concentration in the precursor-containing aqueous solution as calculated from the quantities of barium hydroxide and iron nitrate employed was 0.24 mol/L for the combined concentration of Ba and Fe. The Ba/Fe molar ratio was 0.5.

(2) Preparation of Hexagonal Ferrite by a Continuous Hydrothermal Synthesis Process The aqueous solution (sol) prepared in (1) above was introduced into the liquid tank 32 of the manufacturing apparatus shown in FIG. 1. SUS316 BA tube was employed as the piping of the manufacturing apparatus. While having high-pressure pump 35a feed purified water that had been introduced into liquid tank 31, the water was heated by heating means 34 to cause high-temperature high-pressure water to flow through pipe 100, in this process, the temperature and pressure were controlled so that the temperature of the high-temperature high-pressure water after passing through heating means 34c was 450° C. and the pressure was 30 MPa.

The aqueous solution (sol) was fed by a high-pressure pump 35b to pipe 101 at a liquid temperature of 25° C. and mixed with the high-temperature high-pressure water in mixing element M1. Subsequently, it was heated to 400° C. and pressurized to 30 MPa to synthesize (convert precursor to) hexagonal barium ferrite. Following the synthesis of hexagonal barium ferrite, the solution containing the hexagonal barium ferrite was cooled with cold water in cooling element 37, passed through filtering means 38 and pressure regulating valve 39, and collected in recovery element 40. The collected particles were cleaned with acetic acid aqueous solution (0.2 mol/L) and then centrifuged to separate out the hexagonal barium ferrite powder.

Examples 1-2 to 1-8

With the exception that the concentration of gelatin 1 in the precursor-containing aqueous solution was changed as follows, hexagonal barium ferrite powders were obtained by the same method as in Example 1-1.

Example 1-2: 3.0 g/L
Example 1-3: 5.0 g/L
Example 1-4: 6.5 g/L
Example 1-5: 12.0 g/L
Example 1-6: 30.0 g/L
Example 1-7: 0.4 g/L
Example 1-8: 0.8 g/L Example 1-9

With the exception that the divalent metal salt employed when preparing the precursor-containing aqueous solution was strontium nitrate instead of barium hydroxide, hexagonal strontium ferrite powder was obtained by the same method as in Example 1-1. The concentration in the precursor-containing aqueous solution as calculated from the quantities of strontium, nitrate and iron nitrate employed was 0.24 mol/L for the combined concentration of Sr and Fe. The Sr/Fe molar ratio was 0.5.

Examples 1-10 to 1-13

With the exception that the gelatins shown in Table 1 were employed in concentrations of 1.5 g/L in the same manner as in Example 1-1 during preparation of the precursor-containing aqueous solution, hexagonal barium ferrite powders were obtained by the same method as in Example 1-1.

Comparative Example 1-1

With the exception that the precursor-containing aqueous solution was prepared without using gelatin, hexagonal barium ferrite power was obtained by the same method as in Example 1-1.

Comparative Example 1-2

With the exception that sodium oleate (0.1 mol/L) that is an organic compound employed in the preparation of precursor in Examples of WO 2015/046496A1 was employed, hexagonal barium ferrite powder was obtained by the same method as in Example 1-1.

Comparative Example 1-3

With the exception that 2.1 g of oleic acid, that is an organic compound employed in Examples of Japanese Unexamined Patent Publication (KOKAI) No. 2009-208969, dissolved in 30 cm$^3$ of ethanol was employed instead of gelatin, hexagonal barium ferrite powder was obtained by the same method as in Example 1-1.

Comparative Example 1-4

With the exception that the precursor-containing aqueous solution was prepared without employing gelatin, hexagonal barium ferrite powder was prepared by the same method as in Example 1-1. The hexagonal barium ferrite powder obtained was admixed, along with 0.1 g of gelatin 1 per gram of hexagonal barium ferrite powder, to one liter of purified water. Subsequently, the hexagonal barium ferrite powder was separated by centrifugation. Hexagonal barium ferrite powder with gelatin 1 coated on the particle surfaces thereof was thus obtained.

Comparative Example 1-5

With the exception that polyvinylpyrrolidone (with a weight average molecular weight of 40,000 as measured by the method set forth above) (1.5 g/L), that is an organic compound employed in the preparation of precursor in Examples of WO 2015/046496A1, was employed instead of gelatin, hexagonal barium ferrite powder was obtained by the same method as in Example 1-1.

Example 2-1

(1) Preparation of Precursor-Containing Aqueous Solution

Precursor-containing aqueous solution was prepared without employing gelatin in (1) of Example 1-1 above.

(2) Preparation of Gelatin-Containing Aqueous Solution

Gelatin 1 was dissolved in purified water to prepare a 15 g/L concentration gelatin-containing aqueous solution.

(3) Preparation of hexagonal ferrite by a continuous hydrothermal process

The precursor-containing aqueous solution that had been prepared was introduced into liquid tank 32 of the manufacturing apparatus shown in FIG. 2 and the gelatin-containing aqueous solution that had been prepared was introduced into liquid tank 33. SUS316BA tube was employed as the piping of the manufacturing apparatus.

The purified water that had been introduced into liquid tank 31 was heated by heater 34 while being fed by high-pressure pump 35a, causing high-temperature high-pressure water to flow through pipe 100. In this process, the temperature and pressure were controlled so that the temperature of the high-temperature high-pressure water after passing through heating means 34c was 450° C. and the pressure was 30 MPa.

The precursor-containing aqueous solution was fed to pipe 101 at a liquid temperature of 25° C. using high-pressure pump 35b and mixed with the high-temperature high-pressure water in mixing element M1.

The gelatin-containing aqueous solution was fed to pipe 102 at a liquid temperature of 25° C. using high-pressure pump 35c and caused to mix with the mixed flow of high-temperature high-pressure water and precursor-containing aqueous solution in mixing element M2.

The flow rate of the precursor-containing aqueous solution and the flow rate of the gelatin-containing aqueous solution were adjusted so that the volumetric ratio in the mixed flow was precursor-containing aqueous solution: gelatin-containing aqueous solution=10:1.

The mixed flow of high-temperature high-pressure water, precursor-containing aqueous solution, and gelatin-containing aqueous solution thus obtained was then heated to 400° C. and pressurized to 30 MPa in reaction flow passage 36 to synthesize (convert the precursor to) hexagonal barium ferrite. Following synthesis of hexagonal barium ferrite, the solution containing the hexagonal barium ferrite was cooled with cold water in cooling element 37, passed through filtering means 38 and pressure regulating valve 39, and collected in recovery element 40. The collected particles were washed with acetic acid aqueous solution (0.2 mol/L) and centrifuged to separate hexagonal barium, ferrite powder.

<Measurement Methods and Evaluation Methods>

(1) Identification by X-Ray Diffraction Analysis

The fact that the powders obtained in Examples and Comparative Examples were hexagonal ferrite was confirmed by X-ray diffraction analysis.

(2) Average Particle Size and Coefficient of Variation in Particle Size

The average particle size and coefficient of variation in particle size of the powders obtained in Examples and Comparative Examples were determined by the methods set forth above.

(3) Organic Compound Content in Hexagonal Ferrite Powder

The gelatin content (organic compound content) of the hexagonal ferrite powders of Examples and Comparative Examples in which gelatin was employed was determined by the bicinchoninic acid method (BCA method).

The gelatins for the calibration curve were prepared by mixing with ion-exchange water in ratios of:
(i) 115 g per 10 g of gelatin,
(ii) 120 g per 5 g of gelatin,
(iii) 245 g per 5 g of gelatin, and
(iv) 495 g per 5 g of gelatin;
allowing the mixtures to stand for 30 minutes to cause the gelatins to swell; and stirring for 30 minutes at a liquid temperature of 40° C. to dissolve the gelatins. A 2.5 cm$^3$ quantity of each of the calibration curve gelatin solutions was added to a test tube to prepare samples for calibration.

The type of gelatin employed in preparing the calibration curve samples can be thought of as not affecting, or only slightly affecting, the identification results. Gelatin 1 was employed in the calibration curve samples.

A. 0.25 g quantity of each of the hexagonal ferrite powders of Examples and Comparative Examples prepared using gelatin was weighed out, mixed with 2.5 cm³ of 4 mol/L acetic acid, and heated for 30 minutes to a liquid temperature of 70° C. The hexagonal ferrite powder was dissolved, yielding a sample for identification. An identification reagent was prepared by mixing reagents A, B, and C of a Micro BCA Protein Assay Kit made by Thermo SCIENTIFIC in a volumetric ratio of 25:24:1. A 2.5 cm³ quantity thereof was added to the above calibration curve samples and identification samples. The mixtures were then stirred so that they exhibited color. All of the samples were shaken for 1 hour at a liquid temperature of 60° C. to cause them to exhibit color. They were cooled to room temperature. Ten minutes later, the absorbance at a wavelength of 562 nm was rapidly (within 1 minute) measured with a U-3300 made by Hitachi, the quantity of gelatin was determined, and the gelatin content of the hexagonal ferrite powder was calculated from the quantity of gelatin determined.

The content of the organic compounds employed was calculated by the following method for the hexagonal ferrite powders of Comparative Examples obtained using organic compounds other than gelatins during the preparation of the precursor aqueous solutions.

Portions of the hexagonal ferrite powders obtained were collected and weighed as powder samples for measurement. These powder samples were rapidly heated at a rate of 5° C./minute from 35° C. to 550° C. under an airflow of 50 mL/min using a thermal mass spectrometer (TG/DTA 6300 made by SII Corp.), after which the mass of the powder sample was measured. The organic compound content was determined from the following equation.

Organic compound content (%)=(((mass of powder sample prior to heating)−(mass of powder sample after heating))/(mass of powder sample prior to heating))×100

(4) Evaluation of Dispersion

The dispersion of the hexagonal ferrite powders of Examples and Comparative Examples in the presence of organic solvent and binder was evaluated by the following method.

In a mixed solution of 0.14 part of polyester polyurethane, 1.60 parts of methyl ethyl ketone (2-butanone), and 1.10 parts of cyclohexanone was suspended 1.00 part of hexagonal ferrite powder to obtain a suspension.

To this suspension were added 10.00 parts of zirconia beads with a diameter of 0.1 mmφ. While conducting a dispersion treatment by irradiation with ultrasonic waves, sampling was conducted at regular intervals to collect a portion of the dispersion. The average particle diameter (dispersed particle diameter) in the dispersion collected was measured with an LB-500 dynamic light-scattering particle size distribution measuring apparatus made by HORIBA. The time it took for the dispersed particle diameter that was measured to reach 30 nm (dispersion time) is given in Table 2.

The results of the above are given in Table 2.

TABLE 2

| | Type of hexagonal ferrite | Organic compound added | Organic compound content in hexagonal ferrite powder (Weight %) | Dispersion time (time it took for the dispersed particle diameter that was measured to reach 30 nm) (hours) | Average particle size (nm) | Coefficient of variation in particle size (%) |
|---|---|---|---|---|---|---|
| Ex. 1-1 | Barium ferrite | Gelatin1 | 7.4 | 3 | 18 | 27 |
| Ex. 1-2 | Barium ferrite | Gelatin1 | 13.0 | 4 | 15 | 30 |
| Ex. 1-3 | Barium ferrite | Gelatin1 | 19.4 | 3 | 14 | 30 |
| Ex. 1-4 | Barium ferrite | Gelatin1 | 23.1 | 6 | 13 | 31 |
| Ex. 1-5 | Barium ferrite | Gelatin1 | 35.5 | 10 | 19 | 33 |
| Ex. 1-6 | Barium ferrite | Gelatin1 | 52.4 | 15 | 28 | 35 |
| Ex. 1-7 | Barium ferrite | Gelatin1 | 2.0 | 11 | 20 | 28 |
| Ex. 1-8 | Barium ferrite | Gelatin1 | 3.8 | 6 | 19 | 25 |
| Ex. 1-9 | Strontium ferrite | Gelatin1 | 6.5 | 3 | 15 | 25 |
| Ex. 1-10 | Barium ferrite | Gelatin2 | 7.4 | 3 | 19 | 28 |
| Ex. 1-11 | Barium ferrite | Gelatin3 | 7.4 | 3 | 20 | 30 |
| Ex. 1-12 | Barium ferrite | Gelatin4 | 7.4 | 3 | 22 | 32 |
| Ex. 1-13 | Barium ferrite | Gelatin5 | 7.4 | 5 | 16 | 33 |
| Comp.Ex. 1-1 | Barium ferrite | — | — | 36 | 31 | 42 |
| Comp.Ex. 1-2 | Barium ferrite | Sodium oleate | 8.3 | 28 | 18 | 20 |
| Comp.Ex. 1-3 | Barium ferrite | Oleic acid | 9.1 | 40 | 12 | 30 |
| Comp.Ex. 1-4 | Barium ferrite | Gelatin1 | 9.1 | 33 | 31 | 41 |
| Comp.Ex. 1-5 | Barium ferrite | Polyvinylpyrrolidone | 8.3 | 38 | 22 | 28 |
| Ex. 2-1 | Barium ferrite | Gelatin1 | 8.3 | 2 | 16 | 25 |

Based on the results (dispersion times) given in Table 2, the hexagonal ferrite powders of Examples were determined to undergo dispersion treatment more quickly than the hexagonal ferrite powders of Comparative Examples. By subjecting these hexagonal ferrite powders to a dispersion treatment with organic solvent and binder to prepare a magnetic layer-forming composition, it is possible to shorten the preparation time (dispersion time) and enhance the efficiency of magnetic recording medium production.

An aspect of the present invention can be useful in a field of manufacturing magnetic recording media.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the resent invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method of manufacturing hexagonal ferrite powder, which comprises:
   preparing a hexagonal ferrite precursor by mixing an iron salt and a divalent metal salt in a water-based solution; and
   converting the hexagonal ferrite precursor into hexagonal ferrite within a reaction flow passage, within which a fluid flowing therein is subjected to heating and pressurizing, by continuously feeding a water-based solution comprising the hexagonal ferrite precursor and gelatin to the reaction flow passage.

2. The method of manufacturing hexagonal ferrite powder according to claim 1,
   which comprises preparing the hexagonal ferrite precursor in the presence of gelatin.

3. The method of manufacturing hexagonal ferrite powder according to claim 2,
   wherein a concentration of gelatin in the water-based solution comprising the iron salt and the divalent metal salt ranges from 0.3 g/L to 35.0 g/L.

4. The method of manufacturing hexagonal ferrite powder according to claim 1,
   which comprises preparing the water-based solution comprising the hexagonal ferrite precursor and gelatin by sequentially merging a feed passage to which a water-based solution comprising the hexagonal ferrite precursor is being fed and a feed passage to which a water-based solution comprising gelatin is being fed with a feed passage to which heated and pressurized water is being fed.

5. The method of manufacturing hexagonal ferrite powder according to claim 4,
   wherein a concentration of gelatin in the water-based solution comprising gelatin ranges from 0.3 g/L to 35.0 g/L.

6. The method of manufacturing hexagonal ferrite powder according to claim 1,
   which comprises converting the hexagonal ferrite precursor to hexagonal ferrite within the reaction flow passage by continuously feeding the water-based solution comprising the hexagonal ferrite precursor and gelatin while heating to greater than or equal to 300° C. and pressurizing to greater than or equal to 20 MPa.

7. The method of manufacturing hexagonal ferrite powder according to claim 2,
   which comprises converting the hexagonal ferrite precursor to hexagonal ferrite within the reaction flow passage by continuously feeding the water-based solution comprising the hexagonal ferrite precursor and gelatin while heating to greater than or equal to 300° C. and pressurizing to greater than or equal to 20 MPa.

8. The method of manufacturing hexagonal ferrite powder according to claim 3,
   which comprises converting the hexagonal ferrite precursor to hexagonal ferrite within the reaction flow passage by continuously feeding the water-based solution comprising the hexagonal ferrite precursor and gelatin while heating to greater than or equal to 300° C. and pressurizing to greater than or equal to 20 MPa.

9. The method of manufacturing hexagonal ferrite powder according to claim 4,
   which comprises converting the hexagonal ferrite precursor to hexagonal ferrite within the reaction flow passage by continuously feeding the water-based solution comprising the hexagonal ferrite precursor and gelatin while heating to greater than or equal to 300° C. and pressurizing to greater than or equal to 20 MPa.

10. The method of manufacturing hexagonal ferrite powder according to claim 5,
    which comprises converting the hexagonal ferrite precursor to hexagonal ferrite within the reaction flow passage by continuously feeding the water-based solution comprising the hexagonal ferrite precursor and gelatin while heating to greater than or equal to 300° C. and pressurizing to greater than or equal to 20 MPa.

11. The method of manufacturing hexagonal ferrite powder according to claim 1,
    wherein the hexagonal ferrite that is obtained by the conversion comprises 1.0 weight % to 60.0 weight % gelatin.

12. The method of manufacturing hexagonal ferrite powder according to claim 1,
    wherein the divalent metal salt is one or more divalent metal salt selected from the group consisting of barium salts and strontium salts.

13. The method of manufacturing hexagonal ferrite powder according to claim 1,
    wherein an average particle size of the hexagonal ferrite powder that is manufactured ranges from 5 nm to 30 nm.

14. The method of manufacturing hexagonal ferrite powder according to claim 1,
    wherein a coefficient of variation in particle size of the hexagonal ferrite powder that is manufactured ranges from 5% to 35%.

15. The method of manufacturing hexagonal ferrite powder according to claim 1,
    which manufactures hexagonal ferrite powder that is employed as magnetic powder for magnetic recording.

16. Hexagonal ferrite powder, which is manufactured by the method of manufacturing according to claim 1.

17. A magnetic recording medium,
    which comprises a magnetic layer comprising ferromagnetic powder and binder,
    wherein the ferromagnetic powder is hexagonal ferrite powder according to claim 16.

18. A method of manufacturing a magnetic recording medium,
which comprises:
  manufacturing hexagonal ferrite powder by the method of manufacturing according to claim 1;
  subjecting a mixture of the hexagonal ferrite powder that has been manufactured, organic solvent, and binder to a dispersion processing to prepare a magnetic layer-forming composition; and
  forming a magnetic layer with the magnetic layer-forming composition that has been prepared.

* * * * *